(12) United States Patent
Woo et al.

(10) Patent No.: US 12,333,628 B2
(45) Date of Patent: Jun. 17, 2025

(54) VIRTUAL REALITY SPACE ADJUSTING METHOD WITH RELATIVE TRANSLATION GAIN IN REDIRECTED WALKING AND THE SYSTEM THEREOF

(71) Applicant: Korea Advanced Institute of Science and Technology, Daejeon (KR)

(72) Inventors: Woontack Woo, Daejeon (KR); Dooyoung Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 244 days.

(21) Appl. No.: 18/158,408

(22) Filed: Jan. 23, 2023

(65) Prior Publication Data

US 2023/0267654 A1     Aug. 24, 2023

(30) Foreign Application Priority Data

Jan. 26, 2022    (KR) .................. 10-2022-0011229

(51) Int. Cl.
    *G06T 11/00*      (2006.01)
    *G06T 3/40*      (2006.01)

(52) U.S. Cl.
    CPC ............... *G06T 11/00* (2013.01); *G06T 3/40* (2013.01)

(58) Field of Classification Search
    CPC ...... G06F 3/011; G06F 3/012; G06F 3/04815; G06F 3/0346; G06F 3/017; G06T 19/006;

(Continued)

(56) References Cited

U.S. PATENT DOCUMENTS

2019/0180509 A1*   6/2019   Laaksonen .......... G06F 3/04815
2022/0065651 A1*   3/2022   Beaurepaire ............ G06T 11/60

(Continued)

FOREIGN PATENT DOCUMENTS

KR    10-2012-0122512    1/2014
KR        10-1777755    9/2017

(Continued)

OTHER PUBLICATIONS

Janeh et al (Walking in Virtual Reality: Effects of Manipulated Visual Self-Motion on Walking Biomechanics. https://doi.org/10.1145/3022731; Published: Jan. 2, 2017; pp. 1-15).*

(Continued)

*Primary Examiner* — Xilin Guo
(74) *Attorney, Agent, or Firm* — Christensen O'Connor Johnson Kindness PLLC

(57) ABSTRACT

The present disclosure provides a system for modifying a virtual reality (VR) space, which generates a mutual movable space between an augmented reality (AR) host's reference space and a VR client's space, the system including an acquisition unit that acquires a size of the AR host's reference space, a processing unit that estimates a relative translation gain threshold by adjusting the client's walking speed for each axis of the VR space according to the size of the reference space, and a generation unit that generates the mutual movable space in which movement is possible in mixed reality (MR) with a relative translation gain based on the relative translation gain threshold.

14 Claims, 10 Drawing Sheets

(58) Field of Classification Search
CPC ......... G06T 19/003; G06T 3/40; G06T 11/00; G06T 19/00; G06T 2219/2016; G06V 20/20; G06V 20/653; G06V 10/25
See application file for complete search history.

(56) References Cited

U.S. PATENT DOCUMENTS

| | | | |
|---|---|---|---|
| 2022/0270509 A1* | 8/2022 | Josephson | G09B 19/003 |
| 2023/0206571 A1* | 6/2023 | Darling | H04L 67/1095 |
| | | | 345/633 |

FOREIGN PATENT DOCUMENTS

| | | |
|---|---|---|
| KR | 10-2013-0118105 | 9/2019 |
| KR | 10-2021-0084055 | 10/2021 |

OTHER PUBLICATIONS

Steinicke et al (Estimation of Detection Thresholds for Redirected Walking Techniques; https://ieeexplore.ieee.org/abstract/document/5072212; Date of Publication: Jun. 12, 2009; pp. 17-27).*

Williams et al (Estimation of Rotation Gain Thresholds Considering FOV, Gender, and Distractors; https://ieeexplore.ieee.org/abstract/document/8794563; Date of Publication: Aug. 12, 2019; pp. 3158-3168).*

Office Action for Korean patent application No. 10-2022-0011229, mailed Sep. 11, 2024.

* cited by examiner

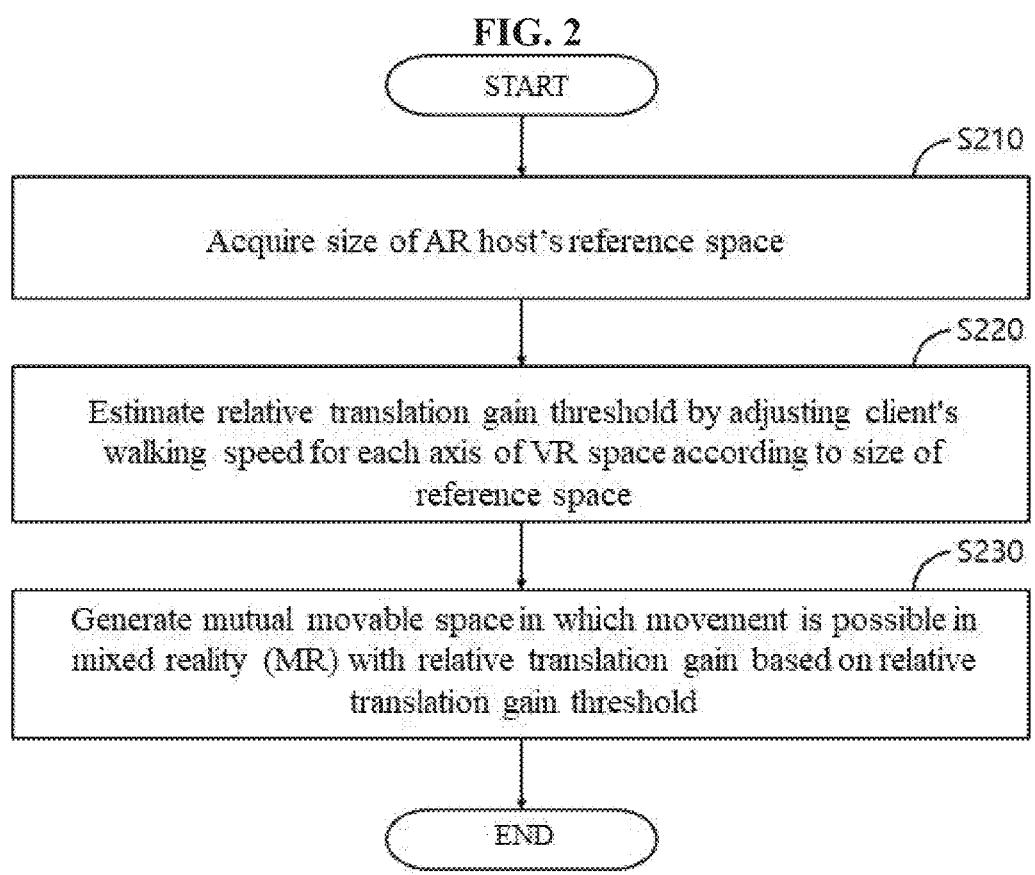

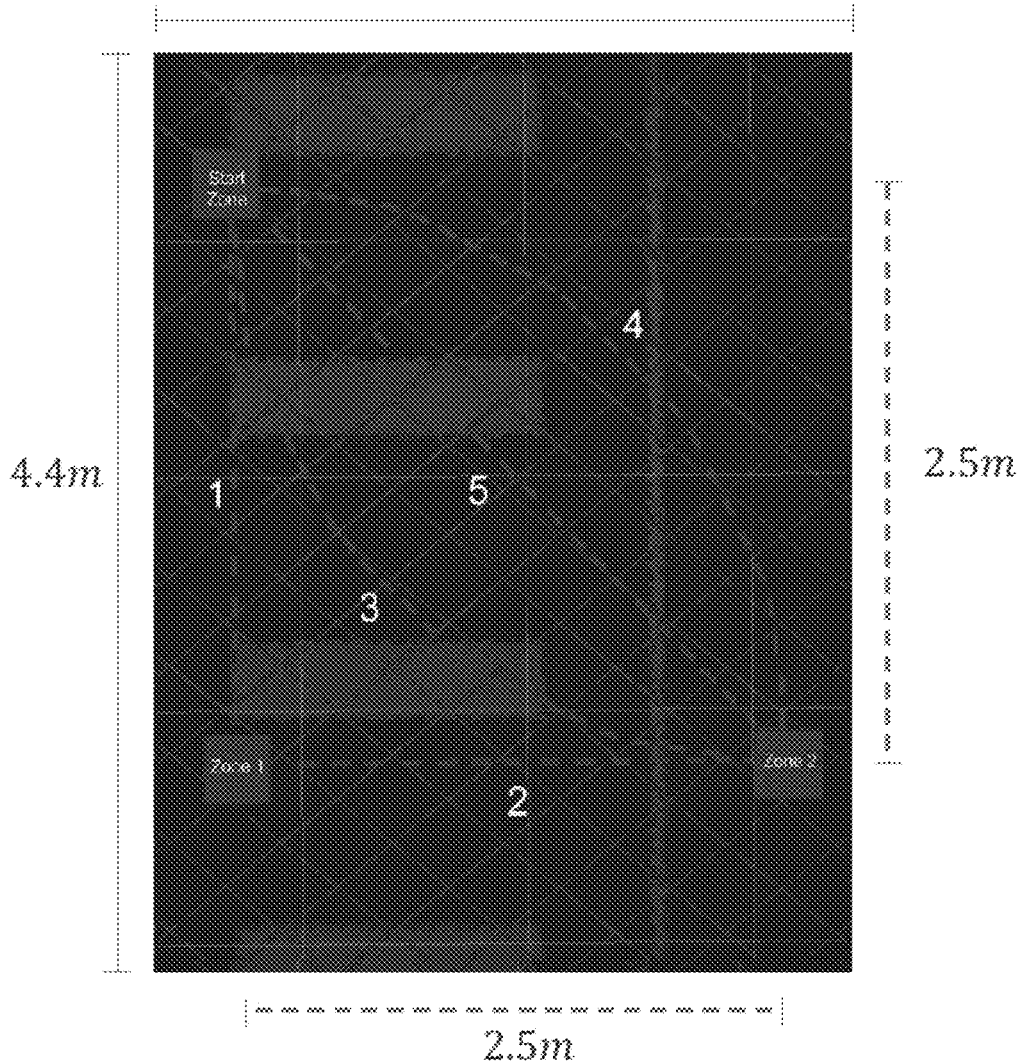

Relative Translation Gain Thresholds (2D Translation Ratio Range)

VIRTUAL REALITY SPACE ADJUSTING METHOD WITH RELATIVE TRANSLATION GAIN IN REDIRECTED WALKING AND THE SYSTEM THEREOF

CROSS-REFERENCE TO RELATED APPLICATIONS

A claim for priority under 35 U.S.C. § 119 is made to Korean Patent Application No. 10-2022-0011229 filed on Jan. 26, 2022, in the Korean Intellectual Property Office, the entire contents of which are hereby incorporated by reference.

BACKGROUND

Embodiments of the present disclosure described herein relate to a method and system for modifying a virtual reality space using a relative translation gain in redirected walking within a virtual reality space, and more particularly, to a technique for creating a mutual movable space between the Augmented Reality (AR) host's reference space and the Virtual Reality (VR) client's space.

Due to the severity of the global Covid-19 pandemic crisis, video conferencing platforms such as Zoom and Microsoft Teams have become dominant channels for remote collaborative work. However, these applications fall short in that their 2D medium only allows for limited levels of co-presence and ineffective delivery of non-verbal communication cues. As an alternative, Mixed Reality (MR) remote collaboration systems, which connect people via Augmented Reality (AR) and Virtual Reality (VR) technologies, are continuously gaining traction. In MR remote collaboration, users can achieve a high level of co-presence with other remote users as avatars placed in a mutual workspace. This space is mostly generated with the host user's AR space as its reference, to which the remote users are virtually transported while wearing VR Head Mounted Displays (HMDs). In fact, research on MR remote collaboration in the past decade has mostly been focused on technologically asymmetric systems concerning an AR host and a VR client.

One of the main challenges for asymmetric MR remote collabo-ration is understanding each user's heterogeneous space and generating an optimized mutual movable space where the AR host and the VR client can be effectively co-located. While past methods sought to find maximum intersecting areas of the local spaces involved, their size decreased as the number of local spaces increased, imposing further restrictions on the users' movements. To solve this problem, other works introduced Redirected Walking (RDW) methods concerning rotation or forced-mapping algorithms. Although the methods had a significant effect in maximizing the mutual space, the methods requires the users to move towards a certain direction, limiting their applicability to collaboration for sequential tasks. Furthermore, discrepancies in the coordinate systems of each space led to a higher probability of communication errors. The methods also did not consider the features of the reference space in determining their parameters.

SUMMARY

Embodiments of the present disclosure provide the concept of relative translation gains, a novel RDW method that can modify the translation values of the width and depth axes in a VR client space such that its coordinates align with those of the AR host space.

However, the technical problems to be solved by the present disclosure are not limited to the above problems, and may be variously expanded without departing from the technical spirit and scope of inventive concept.

According to an embodiment, a method for modifying a virtual reality (VR) space, which generates a mutual movable space between an augmented reality (AR) host's reference space and a VR client's space, includes acquiring a size of the AR host's reference space, estimating a relative translation gain threshold by adjusting the client's walking speed for each axis of the VR space according to the size of the reference space, and generating the mutual movable space in which movement is possible in mixed reality (MR) with a relative translation gain based on the relative translation gain threshold.

The method may further include suggesting a relative translation gain that modifies translation values of width and depth axes in the VR client's space such that the VR client space's coordinates coincide with coordinates of the AR host's space.

The estimating of the relative translation gain may include adjusting a cognitive walking distance of the VR client by changing the walking speed of the client differently within an allowable range that varies according to the size of the AR host's reference space.

The estimating of the relative translation gain may include estimating the relative translation gain threshold defined as a range capable of enabling the client's walking speed to be altered without creating a perceived difference in distance in virtual reality (VR).

The estimating of the relative translation gain may include estimating the relative translation gain threshold, which is the VR client's cognitive threshold for the relative translation gain, using fact that a threshold range of the relative translation gain is dependent on the size of the reference space.

The generating of the mutual movable space may include modifying the mutual movable space by adjusting the client's walking speed for each axis of the VR space without coordinate distortion between the reference space and the VR space.

The generating of the mutual movable space may include generating the mutual movable space, which is a mixed reality (MR) space, in an asymmetric remote collaboration system by using the relative translation gain as an optimization term for space modification in the AR client.

According to an embodiment, a system for modifying a virtual reality (VR) space, which generates a mutual movable space between an augmented reality (AR) host's reference space and a VR client's space, includes an acquisition unit that acquires a size of the AR host's reference space, a processing unit that estimates a relative translation gain threshold by adjusting the client's walking speed for each axis of the VR space according to the size of the reference space, and a generation unit that generates the mutual movable space in which movement is possible in mixed reality (MR) with a relative translation gain based on the relative translation gain threshold.

The system may suggest a relative translation gain that modifies translation values of width and depth axes in the VR client's space such that the VR client space's coordinates coincide with coordinates of the AR host's space.

The processing unit may adjust a cognitive walking distance of the VR client by changing the walking speed of the client differently within an allowable range that varies according to the size of the AR host's reference space.

The processing unit may estimate the relative translation gain threshold defined as a range capable of enabling the client's walking speed to be altered without creating a perceived difference in distance in virtual reality (VR).

The processing unit may estimate the relative translation gain threshold, which is the VR client's cognitive threshold for the relative translation gain, using fact that a threshold range of the relative translation gain is dependent on the size of the reference space.

The generation unit may modify the mutual movable space by adjusting the client's walking speed for each axis of the VR space without coordinate distortion between the reference space and the VR space.

The generation unit may generate the mutual movable space, which is a mixed reality (MR) space, in an asymmetric remote collaboration system by using the relative translation gain as an optimization term for space modification in the AR client.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIG. 2 is an operational flowchart illustrating a method for deforming a virtual reality space according to an embodiment of the present disclosure;

FIG. 4 illustrates a plan view of a virtual space set for estimating a relative translation gain threshold according to an embodiment of the present disclosure;

DETAILED DESCRIPTION

Figure 1:
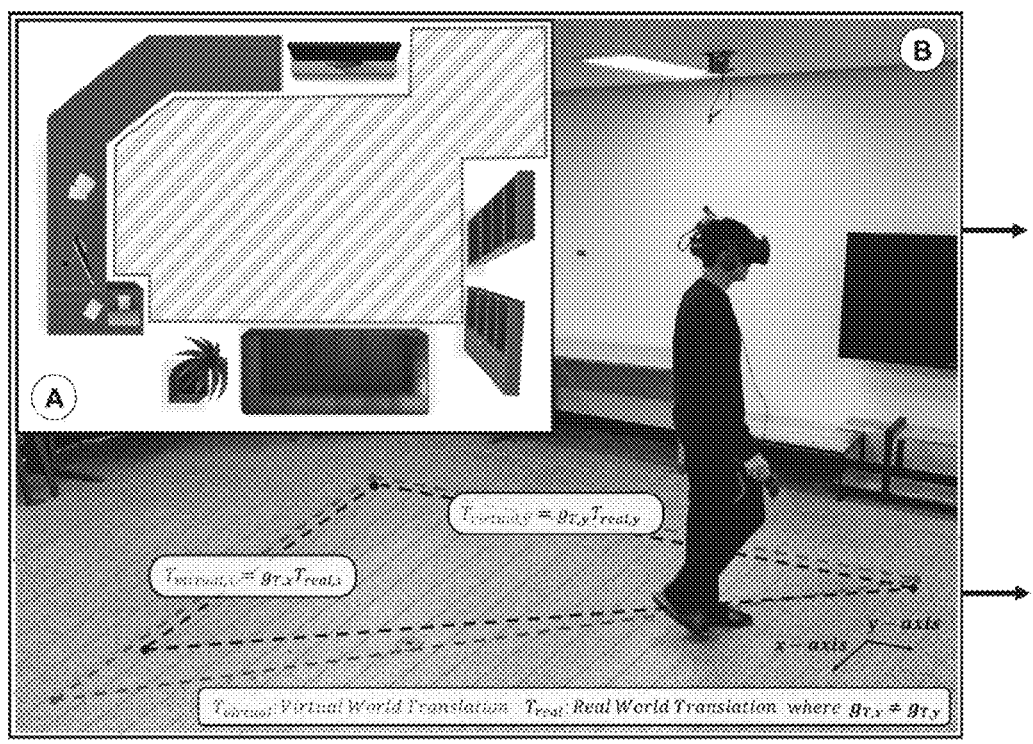
FIGS. 1A and 1B show schematic diagrams for describing relative translation gains adjusted to create an optimal mutual space in mixed reality.

Advantages and features of the present disclosure and methods for achieving them will be apparent with reference to embodiments described below in detail in conjunction with the accompanying drawings. However, the present disclosure is not limited to the embodiments disclosed below, but can be implemented in various forms, and these embodiments are to make the disclosure of the present disclosure complete, and are provided so that this disclosure will be thorough and complete and will fully convey the scope of the invention to those of ordinary skill in the art, which is to be defined only by the scope of the claims.

The terminology used herein is for the purpose of describing particular embodiments only and is not intended to be limiting of the inventive concept. The singular expressions include plural expressions unless the context clearly dictates otherwise. In this specification, the terms "comprises" and/or "comprising" are intended to specify the presence of stated features, integers, steps, operations, elements, parts or combinations thereof, But do not preclude the presence or addition of steps, operations, elements, parts, or combinations thereof.

Unless defined otherwise, all terms (including technical and scientific terms) used herein have the same meanings as commonly understood by one of ordinary skill in the art to which this invention belongs. Further, unless explicitly defined to the contrary, the terms defined in a generally-used dictionary are not ideally or excessively interpreted.

Hereinafter, preferred embodiments of the present disclosure will be described in detail with reference to the accompanying drawings. The same reference numerals are used for the same components in the drawings, and duplicate descriptions of the same components are omitted.

Embodiments of the present disclosure propose the concept of relative translation gains, a novel Redirected Walking (RDW) method that alters the translation values of the width and depth axes of a virtual reality (VR) client space to coincide with the coordinates of an augmented reality (AR) host's space.

Previous RDW methods have focused on maximizing the movable space at the expense of aligning the coordinates between the AR and VR side, and could only be applied to collaborative scenarios involving sequential tasks. The present disclosure solves these problems by adjusting the remote client's walking speed for each axis of a VR space to modify the movable area without coordinate distortion.

The present disclosure may estimate the relative translation gain threshold, defined as the extent to which the walking speed can be altered without creating a perceived difference in distance. In order to reflect features of the reference space in generating the mutual space, the present disclosure may then examine how changing its size affects the threshold value. The present disclosure has showed that for remote clients connected to the larger reference space, relative translation gains can be increased to utilize a VR space bigger than their real space. The present disclosure may be applied to create optimal mutual spaces for a wider variety of asymmetric Mixed Reality (MR) remote collaboration systems.

Hereinafter, the present disclosure will be described in detail with reference to FIGS. 1 to 11.

Figure 1B:
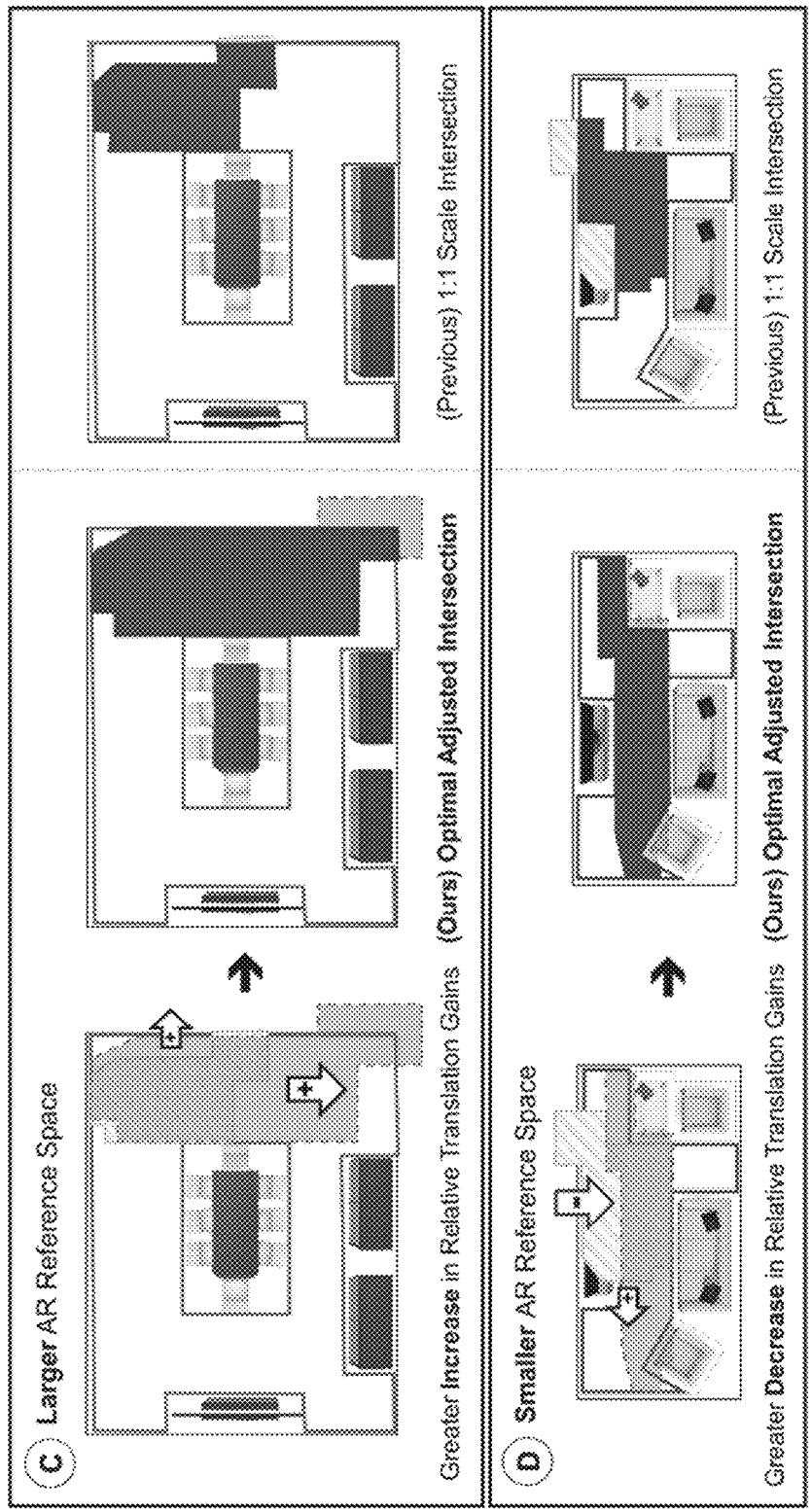

FIGS. 1A and 1B show schematic diagrams for describing relative translation gains adjusted to create an optimal mutual space in mixed reality.

The virtual reality space transformation technology according to an embodiment of the present disclosure manipulates the perceived length of the VR clients' space by changing their walking speed differentially based on the size of the Augmented Reality (AR) host's reference space (or actual space) The present disclosure estimates the VR clients' relative translation gain threshold for the relative translation gains, which refers to the extent to which the avatar's walking speed can be changed without the client noticing the difference in the distance traveled. The present disclosure then explores how the relative translation gain threshold is affected by the size of the reference space by expanding the experiment and comparing the threshold values in two size conditions where one is four times larger than the other.

In the experiment, the probabilities of "larger" responses were significantly lower in the larger space than in the smaller one, leading the threshold values for relative translation gains to be set higher in the former condition. In the larger reference space, the VR client's walking speed could be increased to a greater extent than in the smaller reference space, whereas it could be decreased to a larger degree in the smaller space. This indicates that remote clients can utilize a VR space that is bigger than their original movable space when the AR host's space is relatively large, and one that is smaller for a more limited reference space. The present disclosure concludes that since the relative translation gains' threshold range is dependent on the size of the reference space, constraints on relative translation gains should be set accordingly.

Therefore, as shown in FIGS. 1A and 1B, the present disclosure may create a mutual movable space in which movement is possible in mutual mixed reality in an asymmetric remote collaboration system by using the relative translation gains as an optimization term for space modification on the virtual reality client side.

Hereinafter, as a related study to explain the present disclosure in more detail, heterogeneous space alignment for creating mixed reality (MR) mutual space and application of direction changing walking to increase a movable virtual space will be described.

Aligning Heterogeneous Spaces to Generate MR Mutual Spaces

In the past, several mutual space generation methods for MR remote collaboration based on correlating heterogeneous local spaces were proposed. Pejsa (T. Pejsa, J. Kantor, H. Benko, E. Ofek, and A. Wilson. Room2room: Enabling life-size telepresence in a projected augmented reality environment. In Proceedings of the 19th ACM conference on computer supported cooperative work & social computing, pp. 1716-1725, 2016.) projected two users in different rooms onto an empty sofa in a third, mutual space. However, this method is only applicable to users in a sitting position without any movement. Lehment (N. H. Lehment, D. Merget, and G. Rigoll. Creating automatically aligned consensus realities for ar videoconferencing. In 2014 IEEE International Symposium on Mixed and Augmented Reality (IS-MAR), pp. 201-206. IEEE, 2014) created a mutual movable space from two heterogeneous spaces through 1:1 intersections of the movable area in each space. More recently, Keshavarzi (M. Keshavarzi, A. Y. Yang, W. Ko, and L. Caldas. Optimization and manipulation of contextual mutual spaces for multi-user virtual and augmented reality interaction. In 2020 IEEE Conference on Virtual Reality and 3D User Interfaces (VR), pp. 353-362. IEEE, 2020.) expanded this idea to incorporate more than two heterogeneous spaces in a mutual movable space. While the existing studies further suggested a method to maximize this space, the solution was to modify the physical configuration of each user's space, rather than employing a computative means. Advancing these works, 1:1 forced-mapping algorithms were applied to heterogeneous spaces such that users could utilize larger areas in their own local space. Congdon (B. J. Congdon, T. Wang, and A. Steed. Merging environments for shared spaces in mixed reality. In Proceedings of the 24th ACM Symposium on Virtual Reality Software and Technology, pp. 1-8, 2018.) developed a technique that allows users with different movable spaces to interact in the same VR environment. Tomar (Y. Tomar, A. Srivastava, A. Dey, and O. Sharma. Conformal redirected walking for shared indoor spaces. In The 17th International Conference on Virtual-Reality Continuum and its Applications in Industry, pp. 1-8, 2019.) suggested a pipeline for merging two different indoor spaces in VR with reversible transformations for both position and orientation mappings. However, these methods can be utilized only when the physical properties of the local spaces involved are similar to one another. Furthermore, communication errors may occur due to inconsistencies between the spaces' coordinate systems. To correlate the coordinates of dis-similar spaces, Yoon (L. Yoon, D. Yang, J. Kim, C. Chung, and S.-H. Lee. Placement retargeting of virtual avatars to dissimilar indoor environments. IEEE Transactions on Visualization and Computer Graphics, 2020.) proposed a neural network-based avatar retargeting algorithm that enables two users to communicate with each other in their respective physical spaces. However, this method is not appropriate for collaborative tasks that require sharing the same objects and environments.

One limitation of these space-correlating algorithms is that the size of a mutual movable space created through them decreases as the number of heterogeneous local spaces increases, provided that the physical layout of these spaces is unchanged. Another is that the coordinates of each space are likely to remain different from one another in the mutual movable space. MR remote collaboration systems should be able to provide a sufficiently-sized mutual workspace, regardless of the number of its participants and the disparities between the local spaces which participants are in. Moreover, every collaborator should be able to move around freely in a unified coordinate system for a wider variety of more sophisticated tasks. Accordingly, the present disclosure aims to resolve these issues through our proposed method.

Applying Redirected Walking to Increase Virtual Movable Spaces

Redirected Walking (RDW) is a VR locomotion technique that enables users to explore a wider virtual environment than the real tracked space. Most prior studies on RDW involve the manipulation of rotation values in their approach. Some employed curvature gain in VR to provide a larger movable space for the users by steering their movement towards target objects. Steinicke (F. Steinicke, G. Bruder, J. Jerald, H. Frenz, and M. Lappe. Estimation of detection thresholds for redirected walking techniques. IEEE transactions on visualization and computer graphics, 16(1):17-27, 2009.) asserted that virtual movable spaces could be increased infinitely by applying the rotation gain value they found, given that the user is in a circular-shaped room with a minimum radius of 22 m. On the other hand, Langbehn (E. Langbehn, P. Lubos, G. Bruder, and F. Steinicke. Application of redirected walking in room-scale vr. In 2017 IEEE Virtual Reality (VR), pp. 449-450. IEEE, 2017.) focused on reducing the required size of the local space, presenting an RDW method that could generate a virtual movable space 25 times larger than the reference space. Furthermore, Sra (M. Sra, X. Xu, A. Mottelson, and P. Maes. Vmotion: designing a seamless walking experience in vr. In Proceedings of the 2018 Designing Interactive Systems Conference, pp. 59-70, 2018.) found reducing the field of view or limiting the viewing distance can increase the rotation gain threshold. Sun (Q. Sun, A. Patney, L.-Y. Wei, O. Shapira, J. Lu, P. Asente, S. Zhu, M. McGuire, D. Luebke, and A. Kaufman. Towards virtual reality infinite walking: dynamic saccadic redirection. ACM Transactions on Graphics (TOG), 37(4):1-13, 2018.) used saccades to maximize the effect of rotation-based RDW in creating a VR space larger than the physical environment.

Rotation-based RDW has also been used to avoid conflict between physical objects and users while they explore a virtual environment or control avatar movements in a mutual space to prevent collision among them. Recently, a predictive RDW algorithm named "Multiuser-Steer-To-Optimal-Target" processed up to 32 users in real-time in a mutual VR space. These RDW methods commonly leveraged the user's cognitive ability to perceive and explore a VR space larger than the physical space they are in without noticing the difference. However, these direction re-targeting methods are valid only for scenarios that require the users to walk towards a designated direction without any freedom in their movement. Moreover, these approaches are likely to result in mismatched coordinates between the AR host space and the VR client space when they are applied to MR remote collaboration systems.

As opposed to RDW methods employing rotation, methods of applying translation to reposition users in the virtual environment can align coordinates of heterogeneous spaces while increasing virtual movable spaces. Despite their importance, previous studies on translation-based RDW are relatively few. Interrante (V. Interrante, B. Ries, and L. Anderson. Seven league boots: A new metaphor for augmented locomotion through moderately large scale immersive virtual environments. In 2007 IEEE Symposium on 3D User interfaces. IEEE, 2007.) applied translation gain in the direction the user moved as a means to reduce viewpoint swaying. Steinicke (F. Steinicke, G. Bruder, J. Jerald, H. Frenz, and M. Lappe. Estimation of detection thresholds for redirected walking techniques. IEEE transactions on visualization and computer graphics, 16(1):17-27, 2009.) defined translation gain and estimated the extent to which translation values in an RDW context can be downscaled or upscaled without changing the user's perception of the space. Using drones, Matsumoto (K. Matsumoto, E. Langbehn, T. Narumi, and F. Steinicke. Detection thresholds for vertical gains in vr and drone-based telepresence systems. In 2020 IEEE Conference on Virtual Reality and 3D User Interfaces (VR), pp. 101-107. IEEE, 2020.) estimated how the height of a VR space could be modified in a remote collaboration system through vertical translation gains. However, these works did not consider distance perception in the virtual environment, which is essential to our proposed approach in utilizing translation gains in RDW for MR remote collaboration.

Regarding the ways in which distance is perceived in VR, Zhao (M. Zhao, A. Sinnis-Bourozikas, and V. Interrante. Exploring the use of immersive virtual reality to assess the impact of outdoor views on the perceived size and spaciousness of architectural interiors. In International Conference on Virtual Reality and Augmented Reality, pp. 312-319. Springer, 2019.) reported that the size of a virtual room was underestimated when participants obtained a field of vision longer than the depth of the room through a virtual window. While not implemented in an RDW context, their study indicates that when users are in a relatively larger virtual space where their sight is far-reaching, they may be more sensitive to decreases in space size. Messing (R. Messing and F. H. Durgin. Distance perception and the visual horizon in head-mounted displays. ACM Transactions on Applied Perception (TAP), 2(3):234-250, 2005.) found that with a lower horizon, perceived distance in the virtual environment is biased to be greater than the real distance. While these studies provide insight on how differences in the perceived size of virtual environments affect the extent to which translation gains can be modified to increase the size of a virtual movable space, whether their results can be applied to RDW has yet to be proven.

FIG. 2 is an operational flowchart illustrating a method for deforming a virtual reality space according to an embodiment of the present disclosure.

A method for deforming a virtual reality space according to an embodiment of the present disclosure suggests relative translation gains that modify the translation values of the width and depth axes in a VR client space such that the VR client space's coordinates coincide with the coordinates of the AR host space.

Referring to FIG. 2, in step S210, the size of the AR host's reference space is acquired.

In step S220, a relative translation gain threshold is estimated by adjusting the client's walking speed for each axis of the VR space according to the size of the reference space.

In step S220, a cognitive walking distance of the VR client may be adjusted by changing the walking speed of the client differently within an allowable range that varies according to the size of the AR host's reference space. In this case, in step S220, the present disclosure may estimate the relative translation gain threshold defined as the extent to which the client's walking speed can be altered without creating a perceived difference in distance in virtual reality (VR).

In step S220, the relative translation gain threshold, which is the VR client's cognitive threshold for the relative translation gain, may be estimated using the fact that a threshold range of the relative translation gain is dependent on the size of the reference space.

In step S230, a mutual movable space in which movement is possible in mixed reality (MR) is created with the relative translation gain based on the relative translation gain threshold.

In step S230, the mutual movable space may be modified by adjusting the client's walking speed for each axis of a VR space without coordinate distortion between the reference space (actual space) and the VR space. Accordingly, in step S230, a mutual movable space, which is a mixed reality (MR) space, may be generated in an asymmetric remote collaboration system by using the relative translation gain threshold as an optimization term for space-modification in the AR client.

Here, the asymmetric remote collaboration system means a case where the types of devices worn by a host hosting a meeting and a client participating remotely in the meeting are different, such as AR and VR. In the present disclosure, a remote collaboration system using different types of devices for connection, in which a host hosting a meeting utilizes an augmented reality device and a client utilizes a virtual reality device for connection is referred to as an asymmetric remote collaboration system.

Figure 3:
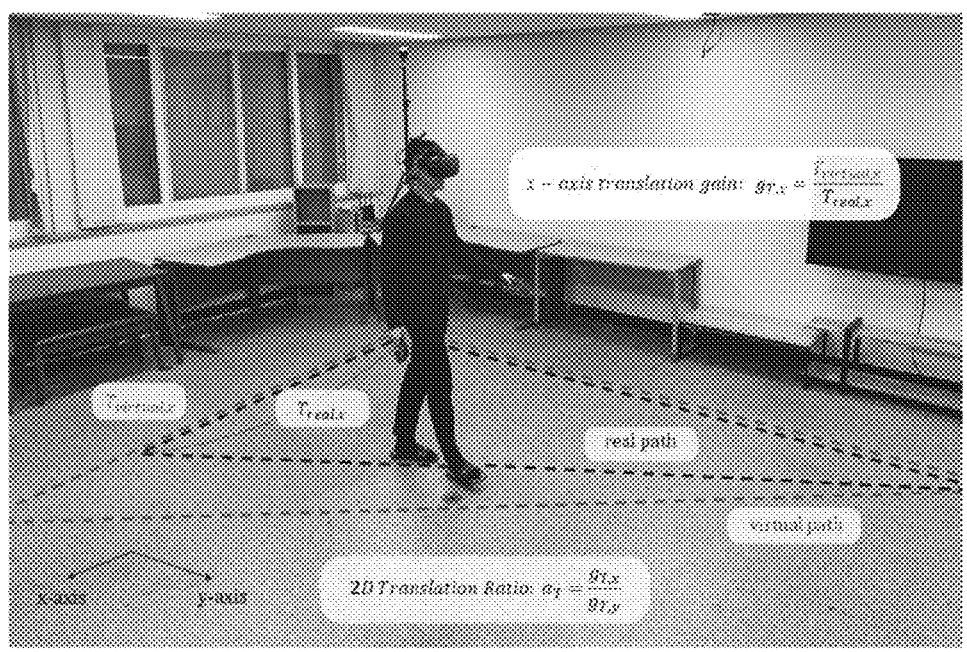
FIG. 3 is a diagram for describing parameters of relative translation gains according to an embodiment of the present disclosure.

FIG. 3 is a diagram for describing parameters of relative translation gain according to an embodiment of the present disclosure.

Translation gain in RDW facilitates spatial deformation for mutual space generation without distorting the coordinate systems of heterogeneous spaces. Applying translation gains relatively to the width and depth axes allows for more space-adaptive modification than applying the translation gains uniformly. It can create a more expansive mutual space better fitted to the physical features of the local space. Therefore, the present disclosure suggests relative translation gains as a novel approach to translation-based RDW. To develop the concept, the present disclosure refers to the definition of translation gain gT of the existing technique (Steinicke (F. Steinicke, G. Bruder, J. Jerald, H. Frenz, and M. Lappe. Estimation of detection thresholds for redirected walking techniques. IEEE transactions on visualization and computer graphics, 16(1):17-27, 2009.)).

$$gT = \frac{T_{virtual}}{T_{real}} \qquad \text{[Equation 1]}$$

In Equation 1, the mapped virtual world translation is Tvirtual and the tracked real world translation is Treal. When a user walks 10 m in the real world but the perceived distance in the virtual world is 12 m, translation gain gT=12/10=1.2. This means that the distance traveled in the virtual world is 20% farther than the actual distance traveled in the real world. When different translation gains are applied to the virtual world's width and depth, the spatial deformation effect would be greater.

Building upon this idea, we conceptualize relative translation gains, a novel RDW technique that can apply different translation gains to each axis of a 2D walkable plane. The relative translation gains represent a pair of translation gains for the x-axis (gT,x) and the y-axis (gT,y). The present disclosure defines the ratio of the two translation gains in a single pair of relative translation gains as "2D translation ratio (αT)," formulized as:

$$\alpha_T = \frac{g_{T,x}}{g_{T,y}} \qquad \text{[Equation 2]}$$

In Equation 2, the virtual world's x-axis translation gain is gT,x and the virtual world's y-axis translation gain is gT,y. As the present disclosure tries to examine how much a translation gain of one axis can be changed relative to the translation gain of another axis, it is referred to as gT,y, that is, the reference translation gain. Thresholds for relative translation gains represent a lower boundary and an upper boundary of 2D translation ratios within which users cannot perceive changes in the distance they are walking in a virtual environment.

The two boundary values consist a relative translation gain threshold: maximum 2D translation ratio and minimum 2D translation ratio. The maximum 2D translation ratio is the upper boundary, which refers to the degree to which the translation gain of an axis can be increased relative to the reference translation gain. The minimum 2D translation ratio is the lower boundary, which refers to the extent to which an axis' translation gain can be decreased relative to the reference translation gain.

FIG. 3 illustrates a conceptual example of how relative translation gains and their parameters are applied to RDW. In this case, Tvirtual,y and Treal,y are the same, meaning that the reference translation gain gT,y is 1.0. On the other hand, gT,x is larger than 1.0, as Tvirtual,x is longer than Treal,x. Assuming that gT,x is 1.1, the 2D translation ratio αT=gT,x/gT,y=1.1/1.0=1.1. With this configuration, a user's walking speed in the virtual world can be adjusted to be up to 10% faster than in the real world, depending on the locomotion direction.

Figure 5A:
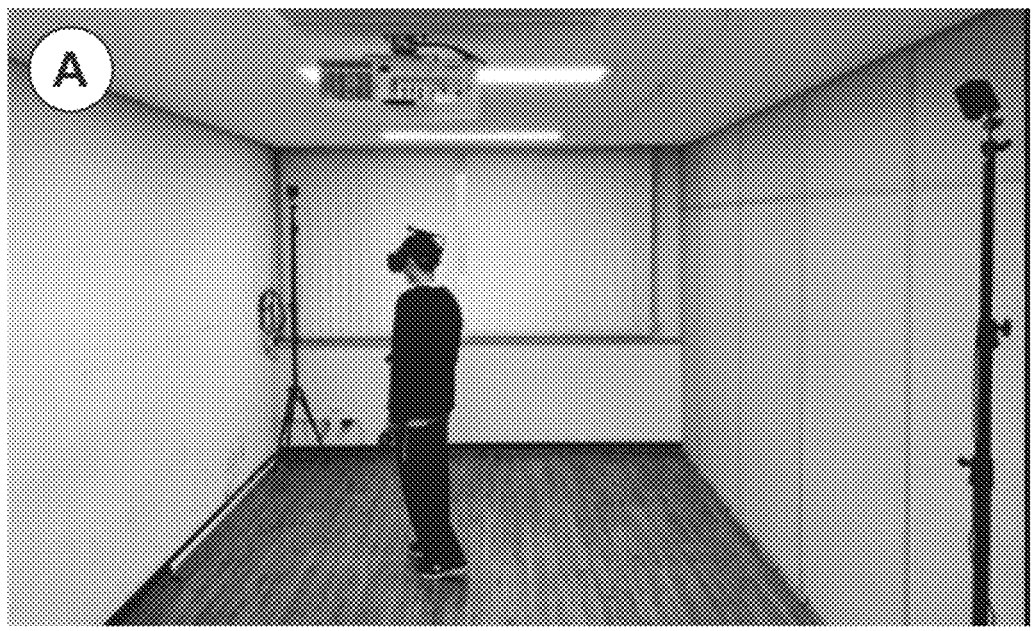
FIGS. 5A and 5B are diagrams for describing an example of estimating a relative translation gain threshold according to an embodiment of the present disclosure.
Figure 5B:
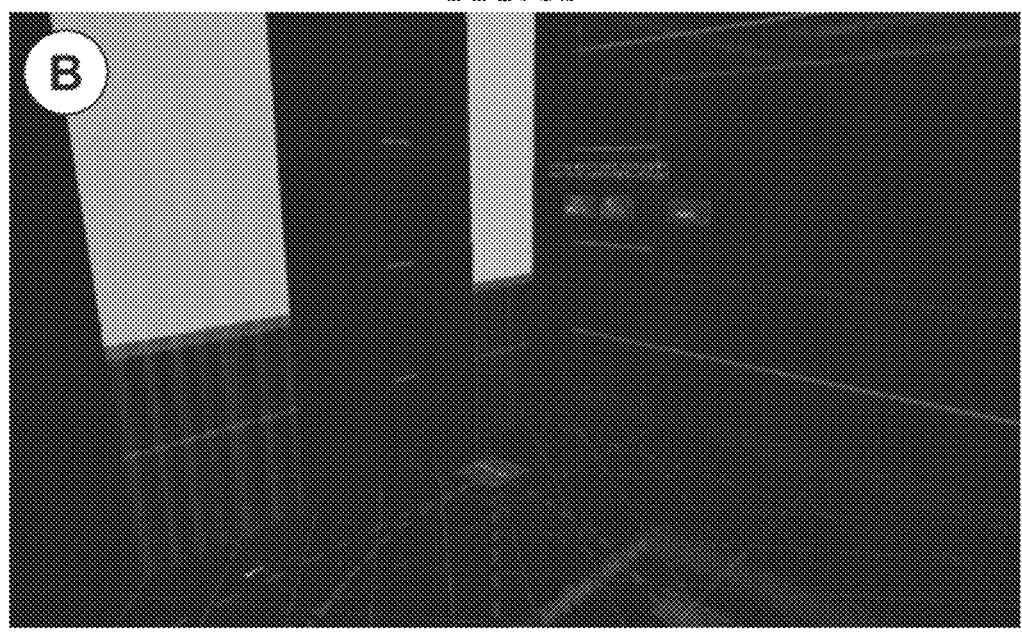

FIG. 4 illustrates a plan view of a virtual space set for estimating a relative translation gain threshold according to an embodiment of the present disclosure, and FIGS. 5A and 5B are diagrams for describing an example of estimating a relative translation gain threshold according to an embodiment of the present disclosure.

To estimate threshold values for relative translation gains, the present disclosure has conducted a preliminary within-subject experiment where 21 participants walked along five designated paths in a 4.4 m×3.3 m HMD mediated virtual environment, as shown in FIG. 4. Through this experiment, the present disclosure also tried to explore the possibility of increasing the threshold value found in a previous research in regards to a single axis.

When relative transition gains are applied to a VR space, speed transformations for the width and depth axes are set differently, which changes the user's perceived speed according to the user's locomotion direction. In order to reflect the various speed changes that can occur while walking for a given relative translation gains value, the present disclosure has configured multiple combined paths rather than a single path to measure the thresholds. When it is assumed gT,x is larger than gT,y, each path is set according to the following conditions. The maximum translation gain (path 1); the minimum translation gain (path 2); a gradual increase in translation gain (path 3); a gradual decrease in translation gain (path 4); and the square mean of the maximum and minimum translation gain (path 5).

To estimate the range of relative translation gain thresholds, the present disclosure has set one condition where the reference translation gain was fixed at 1.0. For this, there was seven relative translation gains where gT,y was fixed at 1.0 and gT,x was manipulated from 0.7 to 1.3 at 0.1 (10%) intervals. To seek how the relative translation gain value could be further increased, the present disclosure implemented another condition where the reference translation gains were set at 1.2. In this case, seven relative translation gains were used where gT,y was fixed at 1.2 and gT,x was manipulated from 0.84 to 1.56 at 0.12 (10%) intervals.

Under the two conditions, participants walked along the five given paths in sequential order while experiencing changes to their speed between the minimum and maximum values set. After completing the walks on all five paths, they answered questionnaires on their subjective threshold measures. Based on previous studies, we used a pseudo-Two-Alternative Forced-Choice (pseudo-2AFC) experimental design for this questionnaire. It asked whether participants felt their movement in the virtual environment was "larger" or "smaller" than in the real space. Participants repeated this process until they finished 56 trials (14 relative translation gains four repetitions). The order of the 14 relative translation gains was randomized and combined into one block. This block was repeated four times with the Latin-squared method for within-counterbalancing. The present disclosure assumed gT,x was larger than gT,y, but only half of the total attempts followed this assumption for counterbalancing.

In the study sessions, the present disclosure first subjected participants to test trials and confirmed that they understood the process, including the post-task questionnaire. After the test trials, participants took off the VR HMD (HTC VIVE Pro) and filled out the Simulator Sickness Questionnaire (SSQ). The participants then wore the HMD again and began the actual experiment. During the experiment, the participants were allowed to take off the HMD whenever they felt they needed to take a break for as long as they wanted. After all trials, the participants were required to answer the SSQ again. Finally, short interviews were conducted on how they felt during the experiment and how this affected their response to the questionnaire.

The present disclosure was set up in an empty office room, as shown in FIG. 5A. The size of the room was identical to the virtual room configuration, and two HTC VIVE base stations (v2.0) were installed at the corners of the room on a tripod. We used Unity 3D (v2019.3.7f1) and steamVR Plugin (v2.6.1) to implement a virtual conference room environment. The five walking paths were visualized on the floor's central area, each within a 2.5 m 2.5 m space. This was to keep the participants on the designated routes and eliminate the visual attraction effect as a potentially confounding factor by placing the visual cues within their immediate field of view. The participants wore an HTC VIVE Pro with a wireless HTC VIVE Pro adapter attached on their heads and held HTC VIVE Pro controllers in both hands.

Figure 6A:
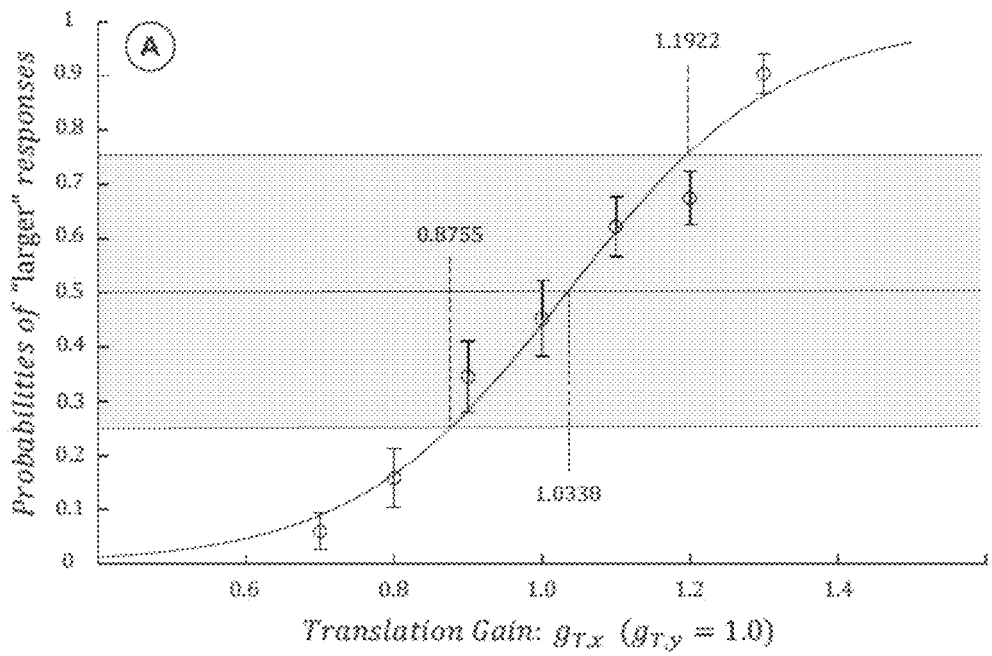
FIGS. 6A and 6B show graphs of results obtained through the experiments of FIGS. 4 and 5.
Figure 6B:
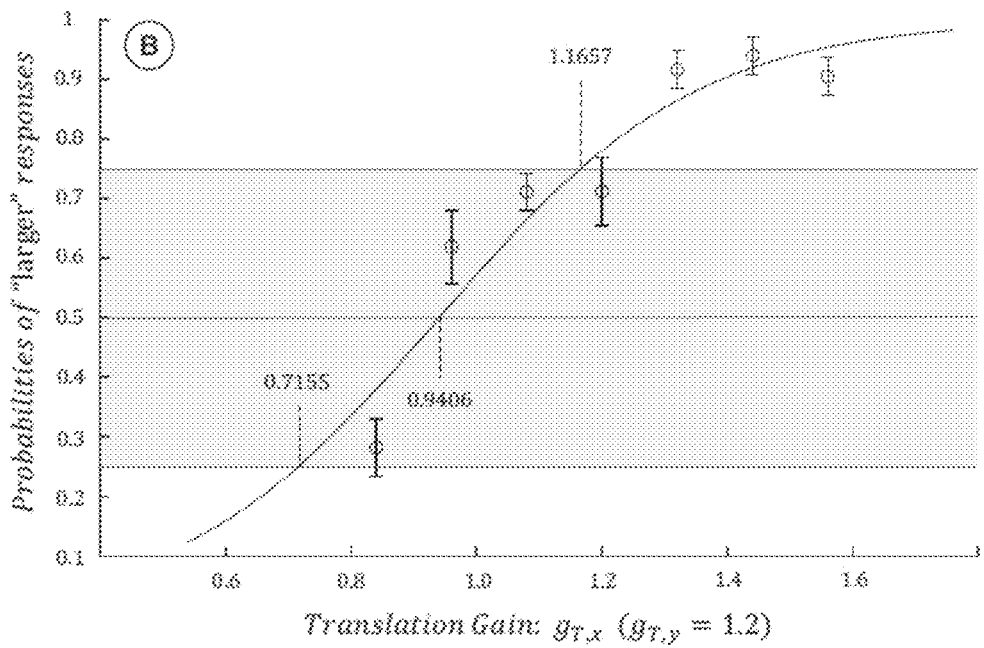

FIGS. 6a and 6b show graphs of results obtained through the experiments of FIGS. 4 and 5.

The present disclosure plotted two fitted psychometric functions from the participants' responses. The relative translation gains when reference translation gain gT,y=1.0, and the relative translation gains when gT,y=1.2. FIG. 6 shows the mean estimated threshold values and Standard Error of a Mean (SEM) for the tested translation gain pairs. The x-axis shows translation gains for the x-axis of the virtual room (gT,x) when the translation gain for the y-axis (gT,y) is fixed. gT,y is 1.0 for FIG. 6(A) and 1.2 for FIG. 6(B). The y-axis of each graph shows the probabilities of participants' responses that stated the virtual distance is "larger" than the real distance. A high probability of "larger" responses indicates that many participants felt they were walking faster in the virtual environment than they actually were. The curves depict the fitted psychometric function of each condition. A standard logistic psychometric function is sued as follows to fit the data:

$$f(x) = \frac{1}{1 + e^{ax+b}} \quad \text{[Equation 3]}$$

From the fitted psychometric function at gT,y=1.0, the present disclosure found the Point of Subjective Equality (PSE), the value at which a user perceives the virtual speed to be identical with the real speed, to be 1.03. Regarding to measurement with existing technique's, that is, Steinicke's Detection Threshold (DT) at 25% and 75%, the results show that gT,x can be increased by 19% or decreased by 12% regarding the reference translation gain. Following the definition of the 2D translation ratio, $\alpha T = gT,x/gT,y$, the relative translation gain threshold when the reference translation gain is 1.0 is from 0.88 to 1.19. These results indicate that the participant's speed can be changed from the real speed to be 12% slower or 19% faster without invoking a change in the users' perception.

From the fitted psychometric function at gT,y=1.2, it is found that the PSE was 0.94. In this case, gT,x can be increased by 17% or decreased by 28% regarding the reference translation gain. The $\alpha T$ range at gT,y=1.2 is from 0.60 to 0.97. These results show that translation gains cannot exceed much from the previous study's result when the reference translation gain is large. Regarding simulator sickness, calculated from weighted items comprising values from 0 to 235.62 points, the mean pre-SSQ Total Severity (TS) score for all participants was 23.51 (SD=27.08). The mean post-SSQ TS score was 47.20 (SD=29.58). The present disclosure has performed a Wilcoxon signed-rank test to compare the pre- and post-SSQ TS scores and found a significant difference between them (Z=3.81, p<0.01).

Figure 7A:
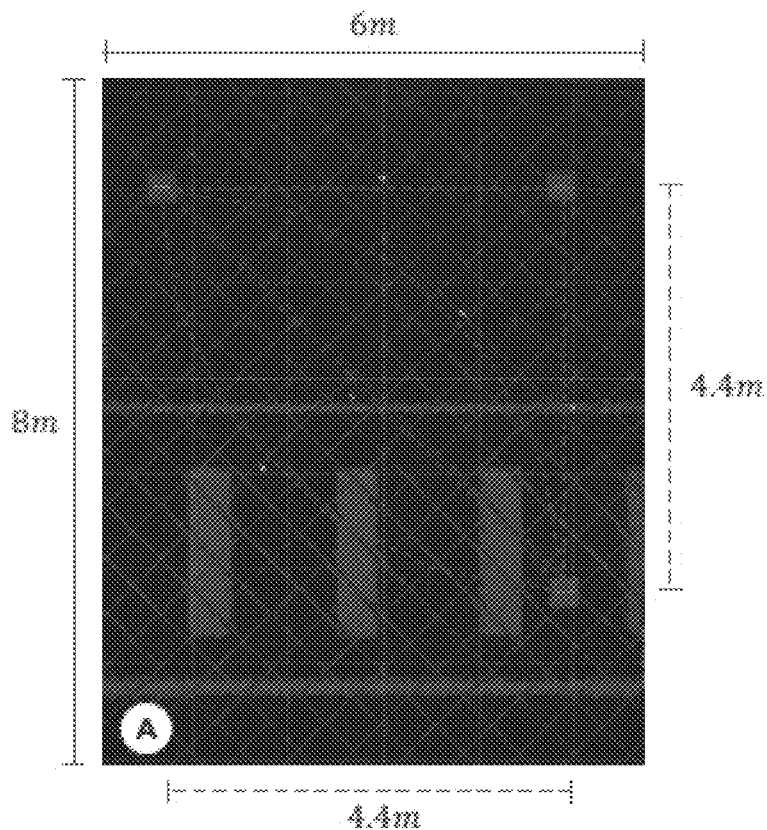
FIGS. 7A and 7B show configurations of two virtual reality (VR) room conditions in a main study according to an embodiment of the present disclosure.
Figure 7B:
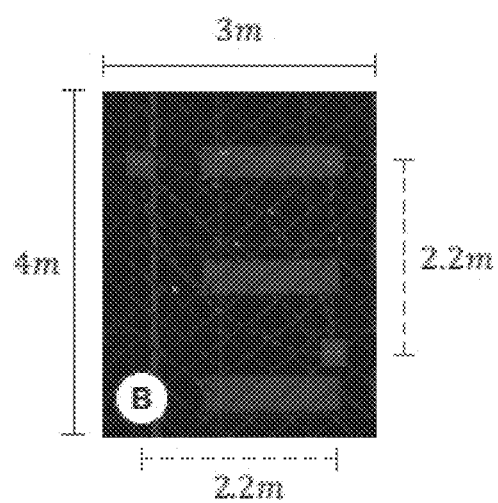
Figure 8:
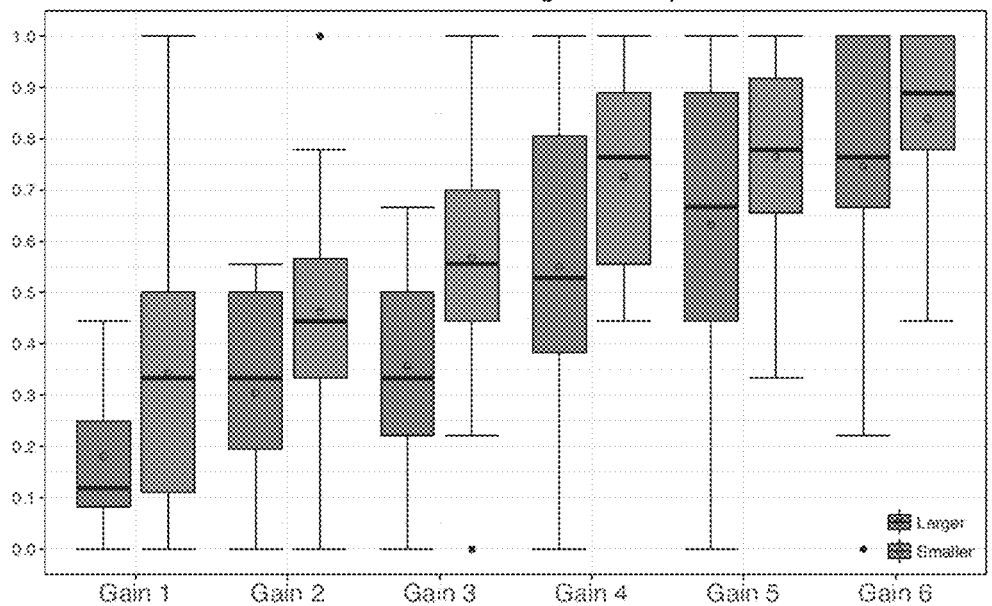
FIG. 8 shows effects of size on the probabilities of 'larger' responses according to an embodiment of the present disclosure.
Figure 9:
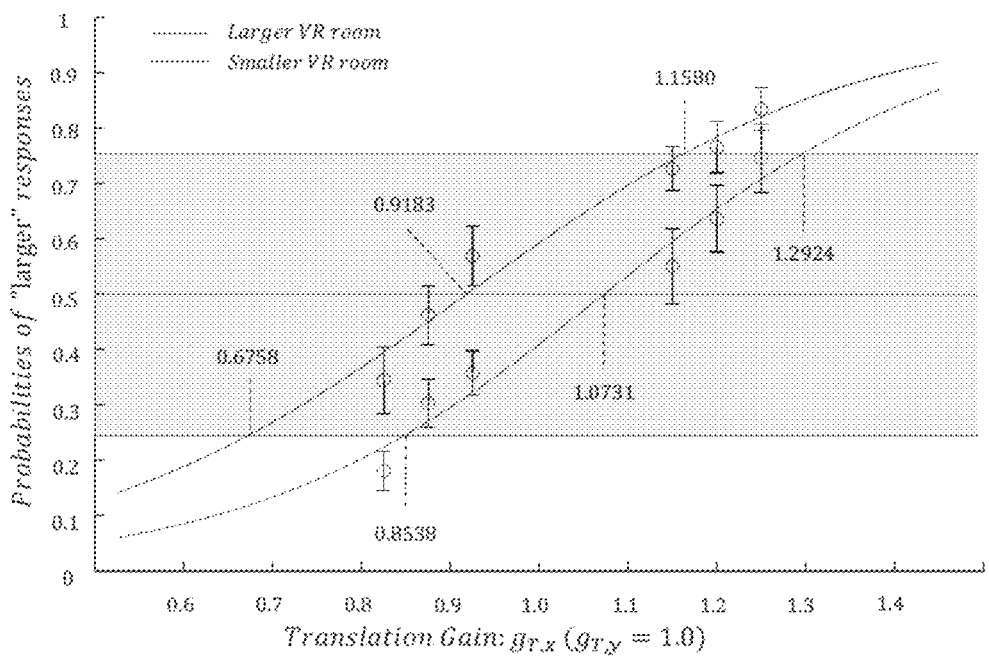
FIG. 9 shows result graphs of fitted psychometric functions of mean estimated threshold values under larger and smaller conditions according to an embodiment of the present disclosure.
Figure 10:
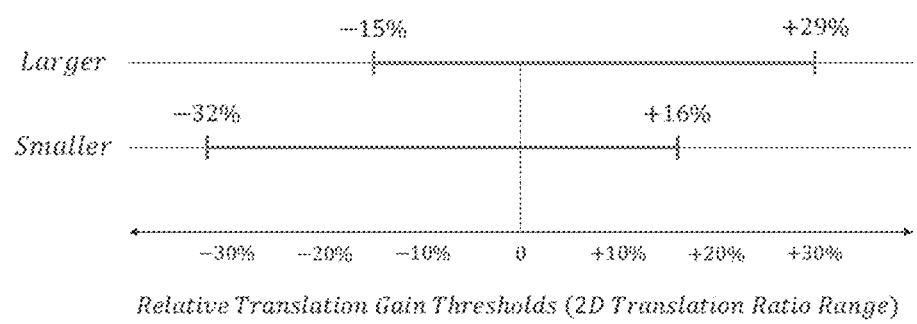
FIG. 10 shows relative translation gain thresholds according to space size according to an embodiment of the present disclosure.

FIGS. 7A and 7B show configurations of two virtual reality (VR) room conditions in a main study according to an embodiment of the present disclosure, and FIG. 8 shows effects of size on the probabilities of 'larger' responses according to an embodiment of the present disclosure. In addition, FIG. 9 shows result graphs of fitted psychometric functions of mean estimated threshold values under larger and smaller conditions according to an embodiment of the present disclosure, and FIG. 10 shows relative translation gain thresholds according to room size according to an embodiment of the present disclosure.

Hereinafter, an experimental procedure for the main study and results derived therefrom will be described.

The present disclosure may suggest relative translation gains to reflect features of the AR host's reference space in modifying the remote VR client's space, and the present disclosure may further investigate how those features-particularly size, which is concerned with user locomotion and perceived walking speed-affect thresholds for relative translation gains in the main study. The present disclosure may also conduct a more accurate estimation of those relative translation gain thresholds by experimenting with gT,x values near those the present disclosure has found in the study. For these goals, the present disclosure may set our research question as follows: How do relative translation gain thresholds differ in relatively larger and smaller reference spaces? To answer this question, the present disclosure referred to Zhao et al.'s study that demonstrated a user becomes more susceptible to shortened distances in a virtual environment where the horizon is farther away. Since this study implies that the user may react more sensitively to decreases in walking speed in a relatively larger VR space, the present disclosure has derived the hypothesis (the probabilities of "larger" responses to all relative translation gains will be lower in a larger virtual environment than in a smaller one).

The present disclosure conducted a within-subject experiment with 20 participants in two different size conditions: a larger VR room (8 m×6 m) and a smaller VR room (4 m×3 m). The present disclosure's content and procedure were similar to that of the preliminary study. In the preliminary study, the present disclosure found that the translation gain value of one axis could not be made significantly bigger than the value found in Steinicke et al.'s study when the reference translation gain is greater than 1.0. Therefore, the present disclosure measured the relative translation gains at a fixed reference translation gain (gT,y) value of 1.0.

The present disclosure may set gT,x values near the minimum 2D translation ratio (0.875) and the maximum 2D translation ratio (1.2) from the preliminary study. The translation gain (gT,x) of the x-axis for estimating the minimum 2D translation ratio was set to one of 0.825, 0.875, and 0.925, and the translation gains (gT,x) for the x-axis for estimating the maximum 2D translation ratio were set to 1.15, 1.2, and 1.25. The y-axis translation gain was fixed at 1.0, and the order of the six relative translation gains including the previously set 6 x-axis translation gains was randomized and combined into one block. This block was repeated nine times with the Latin-squared method for within counter balancing. For each size condition, a participant completed 54 trials (six relative translation gains×nine repetitions). Half of the participants experienced the smaller condition first, and the other half the larger condition. The present disclosure has allotted sufficient breaks between sessions for each size condition, and participants were able to rest at any point they wished during the experiment.

The present disclosure conducted the study in an 8 m×6 m room, and two HTC VIVE base stations (v2.0) on tripods were installed at the corners of the room. As in the preliminary study, the present disclosure utilized Unity 3D (v2019.3.7f1) and steamVR Plugin (v2.6.1) to implement the VR rooms for both size conditions. FIGS. 7A and 7B show the top views of the two conditions. The larger VR room size in FIG. 7A was 8 m×6 m, identical to the real space the study was set in. The smaller room's size in FIG. 7B was a quarter of that of the larger room at 4 m×3 m.

The five paths given in each condition followed the configurations of the paths in the preliminary study. In the larger room, all five paths fit in a 4.4 m×4.4 m space, whereas they were within a 2.2 m×2.2 m space in the smaller room. Except for the ratio of size configurations, other factors were controlled to be the same between the two conditions. The present disclosure used the VR device setting (HTC Vive Pro with a wireless adapter and two HTC Vive Pro controllers) identical to the preliminary study.

The present disclosure examined how the size of the reference space influences users' relative translation gain thresholds by comparing the probabilities of "larger" responses through a two-way repeated-measures ANOVA with size (large, small) and relative translation gains (0.825, 0.875, 0.925, 1.15, 1.2, 1.25, with the reference translation gain fixed at 1.0) as within-subject factors. The present disclosure found a significant main effect of Size ($F(1,19)=8.908$, $p<0.01$) and Translation gain ($F(5,95)=38.480$, $p<0.01$). FIG. 8 shows that the mean value for the probability of "larger" responses was significantly lower in the larger VR room than the smaller room for all six relative translation gains. On the other hand, there was no significant interaction between Size and Translation gain ($F(5, 95)=0.849, p=0.484$).

The present disclosure plotted two fitted psychometric functions from the participant's responses for the six relative translation gains in the larger and smaller conditions. FIG. 9 shows these functions (red curve: larger room; blue curve: smaller room), along with the mean estimated threshold and SEM for the tested gains. The graph's x-axis shows the translation gain for the x-axis ($gT,x$) of the virtual spaces where the reference translation gain ($gT,y$) is fixed to 1.0. The graph's y-axis shows the probabilities of participants' responses that stated the virtual distance is "larger" than the real distance.

Also, the present disclosure found that in the larger room, the PSE was 1.07. Following the definition of 2D translation ratio, $\alpha T=gT,x/gT,y$, the relative translation gain thresholds were 0.85 (lower) and 1.29 (upper). This indicates that the participant's speed can be changed from the real speed to be 15% slower or 29% faster since the user cannot perceive a difference with the actual movement speed even if the user's movement speed in virtual reality is changed 15% slower or 29% faster than the actual movement speed. In the smaller condition, the PSE was 0.92. The relative translation gain thresholds were 0.68 (lower) and 1.16 (upper): This indicates that the participant's speed can be changed from the real speed to be 32% slower or 16% faster since the user cannot perceive a difference with the actual movement speed even if the user's movement speed in virtual reality is changed 32% slower or 16% faster than the actual movement speed. FIG. 10 is a direct representation of how relative translation gain thresholds differ according to the relative size of the reference space.

The mean pre-SSQ TS score, which measured before a user performs the experiment was 23.19 (SD=28.78) for the larger room and 19.07 (SD=21.87) for the smaller room. The mean post-SSQ TS score, which measured after the user has performed the experiment, was 54.98 (SD=33.06) for the larger room and 40.58 (SD=31.46) for the smaller room. There was a significant difference between the mean pre- and post-SSQ TS scores in both conditions (larger room: Z=3.34, p<0.01; smaller room: Z=2.64, p<0.01).

Figure 11:
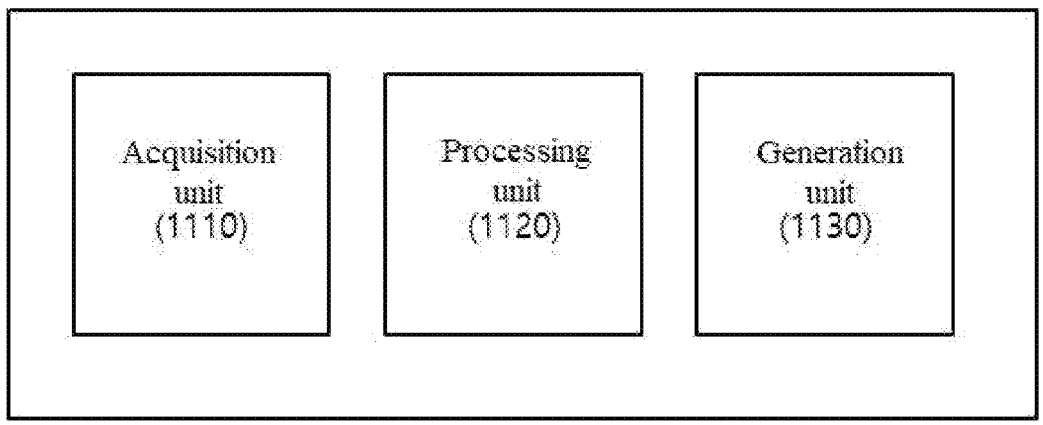
FIG. 11 is a block diagram showing a detailed configuration of a system for deforming a virtual reality space according to an embodiment of the present disclosure.

FIG. 11 is a block diagram showing a detailed configuration of a system for deforming a virtual reality space according to an embodiment of the present disclosure.

Referring to FIG. 11, a system for deforming a virtual reality space according to an embodiment of the present disclosure may create a mutual movable space between an AR host's a reference space and a VR client's space.

To this end, the system for deforming a virtual reality space 1100 according to the embodiment of the present disclosure may include an acquisition unit 1110, a processing unit 1120, and a generation unit 1130.

The acquisition unit 1110 may acquire the size of the AR host's the reference space.

The processing unit 1120 may estimate a relative translation gain threshold by adjusting the client's walking speed for each axis of the VR space according to the size of the reference space.

The processing unit 1120 may adjust a cognitive walking distance of the VR client by changing the walking speed of the client differently within an allowable range that varies according to the size of the AR host's reference space. In this case, the processing unit 1120 may estimate the relative translation gain threshold defined as a range capable of enabling the client's walking speed to be altered without creating a perceived difference in distance in virtual reality (VR).

The processing unit 1120 may estimate the relative translation gain threshold, which is the VR client's cognitive threshold for the relative translation gain, using the fact that a threshold range of the relative translation gain is dependent on the size of the reference space.

The generation unit 1130 may create a mutual movable space in which movement is possible in mixed reality (MR) with the relative translation gain based on the relative translation gain threshold.

The generation unit 1130 may modify the mutual movable space by adjusting the client's walking speed for each axis of a VR space without coordinate distortion between the reference space (actual space) and the VR space. Accordingly, the generation unit 1130 may generate the mutual movable space, which is a mixed reality (MR) space, in an asymmetric remote collaboration system by using the relative translation gain threshold as an optimization term for space transformation in the AR client.

Here, the asymmetric remote collaboration system means a case where the types of devices worn by a host hosting a meeting and a client participating remotely in the meeting are different, such as AR and VR. In the present disclosure, a remote collaboration system using different types of devices for connection, in which a host hosting a meeting utilizes an augmented reality device and a client utilizes a virtual reality device for connection is referred to as an asymmetric remote collaboration system.

Although the description is omitted with reference to the system of FIG. 11, components constituting FIG. 11 may include all the contents described with reference to FIGS. 1 to 10, which are obvious to those skilled in the art.

The system or apparatus described herein may be implemented with hardware components and software components and/or a combination of the hardware components and the software components. For example, the apparatus and components described in the embodiments may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of executing and responding to instructions. The processing device may run an operating system (OS) and one or more software applications that run on the OS. The processing device also may access, store, manipulate, process, and create data in response to execution of the software. For convenience of understanding, one processing device is described as being used, but those skilled in the art will appreciate that the processing device includes a plurality of processing elements and/or multiple types of processing elements. For example, the processing device may include multiple processors or a single processor and a single controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described methods may be embodied in the form of program instructions that can be executed by various computer means and recorded on a computer-readable medium. The computer readable medium may include program instructions, data files, data structures, and the like, alone or in combination. Program instructions recorded on the media may be those specially designed and constructed for the purposes of the inventive concept, or they may be of the kind well-known and available to those having skill in the computer software arts. Examples of computer readable recording media include magnetic media such as hard disks, floppy disks and magnetic tape, optical media such as CD-ROMs, DVDs, and magnetic disks such as floppy disks, Magneto-optical media, and hardware devices specifically configured to store and execute program instructions, such as ROM, RAM, flash memory, and the like. Examples of program instructions include not only machine code generated by a compiler, but also high-level language code that can be executed by a computer using an interpreter or the like. The hardware device described above may be configured to operate as one or more software modules to perform the operations of the present disclosure, and vice versa.

Although the embodiments have been described by the limited embodiments and the drawings as described above, various modifications and variations are possible to those skilled in the art from the above description. For example, the described techniques may be performed in a different order than the described method, and/or components of the described systems, structures, devices, circuits, etc. may be combined or combined in a different form than the described method, or other components, or even when replaced or substituted by equivalents, an appropriate result can be achieved.

Therefore, other implementations, other embodiments, and equivalents to the claims are within the scope of the following claims.

According to the embodiments of the present disclosure, it is possible to propose the concept of relative translation gains, a novel RDW method that differs from existing methods in that the novel RDW method applies translation values to generate mutual movable spaces for MR, aligns VR-AR space coordinates, and enables collaborative tasks requiring freedom of movement.

According to the embodiments of the present disclosure, it is possible to optimize the effect of relative translation gains by adjusting a relative translation gain threshold according to the size of the AR host's reference space.

According to the embodiments of the present invention, a method for generating a mixed reality (MR) space in an asymmetric remote collaboration system using an optimization term for space modification on the virtual reality (VR) client side is proposed, adaptively adjusting the width and depth of the client space, according to the size of the reference space.

However, the effects of the present disclosure are not limited to the above effects, and may be variously expanded without departing from the spirit and scope of the inventive concept.

While the present disclosure has been described with reference to exemplary embodiments, it will be apparent to those skilled in the art that various changes and modifications may be made without departing from the spirit and scope of the present disclosure. Therefore, it should be understood that the above embodiments are not limiting, but illustrative.

What is claimed is:

1. A method for modifying a virtual reality (VR) space, which generates a mutual movable space between an augmented reality (AR) host's reference space and a VR client's space, the method comprising:
   acquiring a size of the AR host's reference space;
   estimating a relative translation gain threshold by adjusting the client's walking speed for each axis of the VR space according to the size of the reference space; and
   generating the mutual movable space in which movement is possible in mixed reality (MR) with a relative translation gain based on the relative translation gain threshold.

2. The method of claim 1, further comprising:
   suggesting a relative translation gain that modifies translation values of width and depth axes in the VR client's space such that the VR client space's coordinates coincide with coordinates of the AR host's space.

3. The method of claim 1, wherein the estimating of the relative translation gain includes adjusting a cognitive walking distance of the VR client by changing the walking speed of the client differently within an allowable range that varies according to the size of the AR host's reference space.

4. The method of claim 3, wherein the estimating of the relative translation gain includes estimating the relative translation gain threshold defined as a range capable of enabling the client's walking speed to be altered without creating a perceived difference in distance in virtual reality (VR).

5. The method of claim 4, wherein the estimating of the relative translation gain includes estimating the relative translation gain threshold, which is the VR client's cognitive threshold for the relative translation gain, using fact that a threshold range of the relative translation gain is dependent on the size of the reference space.

6. The method of claim 1, wherein the generating of the mutual movable space includes modifying the mutual movable space by adjusting the client's walking speed for each axis of the VR space without coordinate distortion between the reference space and the VR space.

7. The method of claim 6, wherein the generating of the mutual movable space includes generating the mutual movable space, which is a mixed reality (MR) space, in an asymmetric remote collaboration system by using the relative translation gain as an optimization term for space modification in the VR client.

8. A system for modifying a virtual reality (VR) space, which generates a mutual movable space between an augmented reality (AR) host's reference space and a VR client's space, the system comprising:
   an acquisition unit configured to acquire a size of the AR host's reference space;
   a processing unit configured to estimate a relative translation gain threshold by adjusting the client's walking speed for each axis of the VR space according to the size of the reference space; and
   a generation unit configured to generate the mutual movable space in which movement is possible in mixed reality (MR) with a relative translation gain based on the relative translation gain threshold.

9. The system of claim 8, wherein the system is configured to suggest a relative translation gain that modifies translation values of width and depth axes in the VR client's space such that the VR client space's coordinates coincide with coordinates of the AR host's space.

10. The system of claim 8, wherein the processing unit is configured to adjust a cognitive walking distance of the VR client by changing the walking speed of the client differently within an allowable range that varies according to the size of the AR host's reference space.

11. The system of claim 10, wherein the processing unit is configured to estimate the relative translation gain threshold defined as a range capable of enabling the client's walking speed to be altered without creating a perceived difference in distance in virtual reality (VR).

12. The system of claim 11, wherein the processing unit is configured to estimate the relative translation gain threshold, which is the VR client's cognitive threshold for the relative translation gain, using fact that a threshold range of the relative translation gain is dependent on the size of the reference space.

13. The system of claim 8, wherein the generation unit is configured to modify the mutual movable space by adjusting the client's walking speed for each axis of the VR space without coordinate distortion between the reference space and the VR space.

14. The system of claim 13, wherein the generation unit is configured to generate the mutual movable space, which is a mixed reality (MR) space, in an asymmetric remote collaboration system by using the relative translation gain as an optimization term for space modification in the VR client.

\* \* \* \* \*